United States Patent
De Romano

[11] 3,829,542
[45] Aug. 13, 1974

[54] METHOD OF MANUFACTURING A POROUS ARTICLE

[76] Inventor: Oscar Chilesotti De Romano, Le Roqueville, 20 Bd. Princesse Charlotte, Monte-Carlo, Monaco

[22] Filed: July 27, 1972

[21] Appl. No.: 275,865

[52] U.S. Cl.................... 264/71, 117/63, 264/123, 264/134, 264/344
[51] Int. Cl............................ B29b 1/00, B29b 3/04
[58] Field of Search ............ 264/123, 71, 134, 265, 264/341, 344; 117/62.1, 63

[56] References Cited
UNITED STATES PATENTS
2,297,248   9/1942   Rudolph ........................ 264/123 X
2,428,771   10/1947   Almy .............................. 264/123 X
2,433,727   12/1947   Arnold ........................ 264/DIG. 69

Primary Examiner—Robert F. White
Assistant Examiner—Thomas P. Pavelko
Attorney, Agent, or Firm—Lane, Aitken, Dunner & Ziems

[57] ABSTRACT

A method of manufacturing a porous article and an article produced thereby in which a plurality of polymeric particles are coated with a plasticizer placed in a mold to which is added an amount of an organic solvent sufficient to dissolve a surface portion of each of the particles so that the abutting particles stick together. The solvent and plasticizer may then be completely vaporized so that the substantially dissolved surface portions will once again assume a solid state and form a porous unitary structure corresponding to the shape of the mold. According to a preferred embodiment, the particles are preferably dried before they are subjected to the solvent and plasticizer treatment. Any residual amount of plasticizer remaining in the molded product will impart its stated effect to the molded article but its main function to delay the action of the solvent on the particles in the upper portion of the mold until the solvent has contacted the particles in the lower portion of the mold.

11 Claims, 2 Drawing Figures

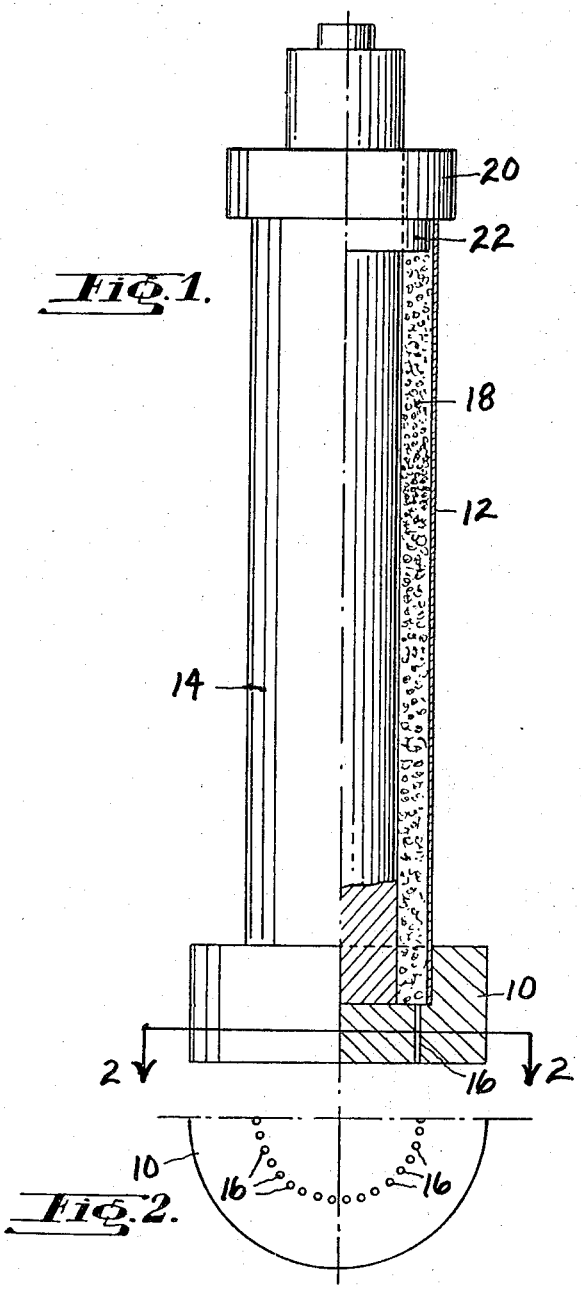

3,829,542

METHOD OF MANUFACTURING A POROUS ARTICLE

BACKGROUND OF THE INVENTION

This invention relates to a method of manufacturing a porous article and an article produced thereby, and more particularly to such a method in which a plurality of polymeric particles are adhered together to form the finished article.

Various types of porous articles utilized in draining, filtering processes, etc., have been proposed. For example, porous concrete pipes have been utilized to permit water to seep therethrough for transportation to other areas such as away from a building or the like. However, these concrete pipes suffer from the fact that they are expensive to manufacture, are easily clogged due to the relatively low degree of porosity, and are difficult to handle due to their weight.

Although the use of plastic has been suggested in the manufacture of porous articles, the equipment and labor involved has made the costs relatively high. Also the final product has suffered from a brittleness and, in some manufacturing techniques, the size of the product has been limited.

SUMMARY OF THE INVENTION

It is therefore an object of the present invention to provide a method of manufacturing a porous article and an article produced thereby which enjoy several advantages including ease and relatively low cost of manufacture, with the article enjoying a relatively high degree of porosity, high strength, and a relatively low weight.

Toward the fulfillment of this and other objects of the present invention, the method of the present invention comprises the steps of providing a plurality of polymeric particles, drying said particles to remove substantially all the moisture therefrom, coating the particles with a plasticizer, placing the particles in a mold defining a space corresponding to the final shape of the article, treating the particles with a sufficient quantity of an organic solvent so as to cause at least abutting surfaces of said particles to dissolve and adhere to each other and form a porous unitary structure.

BRIEF DESCRIPTION OF THE DRAWINGS

FIG. 1 is a partial elevational, partial sectional view depicting a mold utilized in one embodiment of the method of the present invention; and FIG. 2 is a partial cross-sectional view taken along the line 2—2 of FIG. 1.

DESCRIPTION OF THE PREFERRED EMBODIMENTS

According to the preferred embodiment of the present invention a plurality of small polymeric particles, preferably in the form of thermoplastic particles such as polystyrene, polystyrol, polystyrene-acrylonitrile, and the like, are formed in any known manner with each preferably being of a solid cylindrical shape having a diameter and length of between 1 ½ - 3 millimeters.

The particles are then dried by any convenient means, such as by placing them in a ventilated drum and passing dry air through the drum and over the particles to remove substantially all of the moisture from the particles.

The particles are then coated with a plasticizer, preferably in the form of a phthalate such as dimethyl phthalate, diethyl phthalate, and dibutyl phthalate. Such plasticizers are well known and are commercially marketed under the tradenames Palatinol M and Gedeflex 144, manufactured by C & F Chimie, Paris, France. A preferred method of coating the particles is to place the particles in a hollow, rotating drum and introducing the plasticizer in liquid form into the drum. The volume of the drum occupied by the particles is relatively low so that a thorough mixing occurs, resulting in the plasticizer coating the surfaces of the particles.

The particles thus treated are placed in a mold defining a void corresponding to the final shape of the porous article desired. For purposes of example, a mold utilized in the manufacture of a pipe will be described with reference to the drawings. The mold comprises a base member 10 having a counterbore formed in one surface thereof for supporting an outer hollow cylindrical member 12 and an inner cylindrical member 14 which telescopes within the outer cylindrical member, with the outside diameter of the inner cylindrical member being smaller than, and spaced from, the inner diameter of the outer cylindrical member to define a space therebetween for receiving the thermoplastic particles. It is understood that the outer cylindrical member 12 and the inner cylindrical member 14 may be affixed in the counterbore provided in the base member 10 in a conventional manner.

A plurality of through openings 16 are provided in the base member 10 which communicate with the space defined between the outer cylindrical member 12 and the inner cylindrical member 14 for purposes that will be described in detail later.

The thermoplastic particles which have been coated by the plasticizer as described above are then poured into the space defined between the outer cylindrical member 12 and the inner cylindrical member 14 as shown by the reference numeral 18 in FIG. 1.

Preferably the mold is then vibrated in any conventional manner in order to insure an even distribution of the particles throughout the space defined in the mold.

As is apparent from FIG. 1 of the drawings, the upper end portion of the inner cylindrical member 14 projects from the upper end portion of the outer cylindrical member 12, and an annular ring 20 extends over the inner cylindrical member 14 and abuts the upper end of the outer cylindrical member 12. An annular extension 22, in the form of a plug, is provided on the bottom end of the ring 20 as viewed in FIG. 1 and is sized to extend within the outer cylindrical member 12 so that when the ring is placed in an abutment over the end of the outer cylindrical member the extension serves to level the upper surface of the thermoplastic materials 18 in the space defined between the members 12 and 14.

A predetermined amount of an organic liquid solvent such as ketone, and preferably acetone, is then poured into the top of the space defined by the cylindrical members 12 and 14 whereby the solvent seeps through the bed of particles to coat the outer surfaces of each, with the excess solvent draining through the opening 16 provided in the base member 10. The use of a solvent in liquid form is particularly advantageous since it can pass by gravity through the entire mold and uniformly coat the particles without having to be vaporized or without the use of external forces.

It is understood that the solvent, as well as the plasticizer, are selected to be of a type and quantity to vaporize completely under the conditions provided in the method of the present invention, for reasons that will be described later.

The solvent functions in a conventional manner to solvate, or substantially dissolve, an outer surface portion of each of the particles so that a blending of solute will take place where the particles contact each other causing the particles to stick together.

The ring 20 is removed from the inner cylindrical member 14 and the latter member is then removed from the outer cylindrical member 12, with the coating of plasticizer and solvent on the particles facilitating the latter removal due to their lubricating action, and with the resultant exposure of the inner wall of the pipe thus formed to air promoting the vaporization of the plasticizer and solvent.

The vaporization of the plasticizer and solvent may be accelerated in any conventional manner such as by placing the form in an oven at a predetermined temperature for a predetermined time or by passing hot air over the treated materials in the form, etc.

With the solvent and plasticizer thus removed the dissolved portions of the thermoplastic particles will harden together causing the adjacent particles to adhere and the final article, which in this example is a pipe, to be formed.

The product thus produced is extremely porous due to the random dispersion of the thermoplastic particles whose basic shape is altered very little during the above process. Also, the addition of the plasticizer insures a relatively high modulus of elasticity to enable the product to withstand cracking, shearing and the like, under external forces.

In the manufacture of pipes of relatively long lengths, the solvent poured into the upper portion of the mold often acts to dissolve too great a portion of each of the thermoplastic particles located in the upper portion of the space between the cylindrical members 12 and 14 before it completely seeps down through all the particles, including those in the lower portion of the mold. This will often cause a substantial portion of each of the thermoplastic particles in the upper portion of the mold to dissolve and therefore render this portion of the finished product non-porous. However, in addition to its conventional function discussed above, the plasticizer also functions to delay the action of the solvent, and can be selected to do so for a predetermined time until the solvent completely seeps through the entire length of the space between the cylindrical members 12 and 14 and coats the surfaces of all the particles contained therein. As a result, articles of unlimited lengths can be produced.

It can be appreciated that the shape of the articles manufactured according to the present invention can be varied by simply varying the shape of the mold. For example, a porous slab may be produced for certain corresponding filtering applications. In each case, the plasticizer can function to delay the dissolving action of the solvent until it completely coats the surfaces of all the particles in the mold in the above manner, and, if applied to particles in a mold having relatively great horizontal distances between adjacent mold surfaces, also functions to hold the adjacent particles together and thus prevent sagging before application of the solvent.

Also, the size of the thermoplastic materials can be varied in order to vary the porosity of the finished article, with an increase in the size of the thermoplastic materials causing an increase in the porosity of the final article.

The process of the present invention enjoys several advantages. First of all, it can be performed in a relatively simple manner without the use of compression, and with the relatively low amount of heat required to promote the evaporation of the solvent and plasticizer, if necessary. Also, the method of the present invention avoids the use of relatively expensive molds requiring collapsible male members and sectioned female members since the cylindrical mold members of the present invention may retain their same shape during all stages of manufacture.

The porous article produced by the method of the present invention enjoys several advantages including a high increased strength characteristics, relatively low weight, and a very high degree of porosity.

Of course, other variations of the specific construction and arrangement of the porous article disclosed above can be made by those skilled in the art without departing from the invention as defined in the appended claims.

I claim:

1. A method of manufacturing a porous article comprising the steps of coating a plurality of polymeric particles with a plasticizer, placing the coated particles in a mold defining a space corresponding to the final shape of the article, introducing to the mold a liquid organic solvent of a quantity and type that causes a surface portion of each particle to dissolve and the particles to stick together, passing the solvent throughout the mold to coat the outer surfaces of the particles said plasticizer being of a type and quantity to delay the dissolving action of said solvent until it substantially coats all of the particles in said mold, allowing the particles to stick together and substantially removing said plasticizer and said solvent from the molded article.

2. The method of claim 1 further comprising the step of drying said particles before said step of coating.

3. The method of claim 2 wherein said step of drying comprises the step of placing said particles in a ventilated drum and passing dry air through the drum and over the particles.

4. The method of claim 1 wherein said plasticizer and said solvent are removed by vaporization after said step of treating with solvent.

5. The method of claim 1 further comprising the step of vibrating the mold in order to insure an even distribution of said particles throughout the space defined by said mold.

6. The method of claim 1 wherein said mold consists of an outer cylindrical member and an inner cylindrical member defining a space therebetween for receiving said treated particles to form a porous pipe.

7. The method of claim 6 further comprising the step of removing the inner member of the mold after said solvent treatment to expose the inner surface of the formed pipe to air, said solvent acting as a lubricant to facilitate removal of the mold.

8. The method of claim 7 further comprising the step of removing the outer portion of the mold from the formed pipe after a substantial portion of said solvent and said plasticizer have been vaporized from said porous pipe.

9. The method of claim 1 wherein said solvent is introduced in liquid form to the upper portion of the mold whereby it passes by gravity through the particles throughout the mold and coats the outer surfaces of the particles.

10. The method of claim 1 wherein said plasticizer is dimethyl phthalate.

11. The method of claim 1 wherein said polymeric particles are in the form of thermoplastic particles.

* * * * *